April 11, 1939. J. CAVANAGH 2,153,611
SWEAT BAND MARKER AND FASTENING CLIP
Filed Jan. 6, 1937
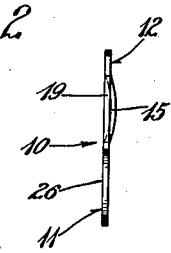
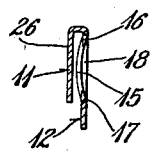
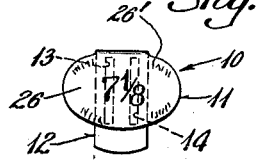
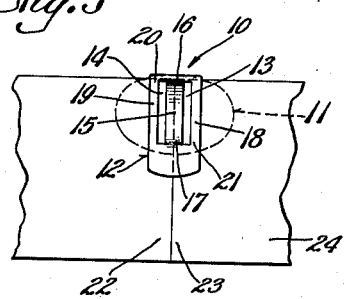
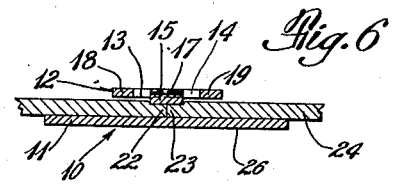
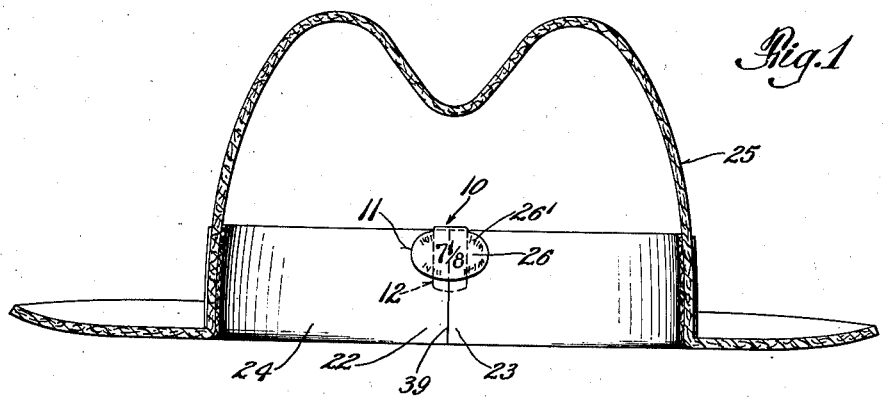
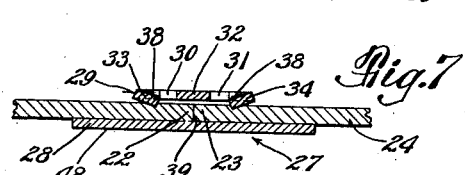
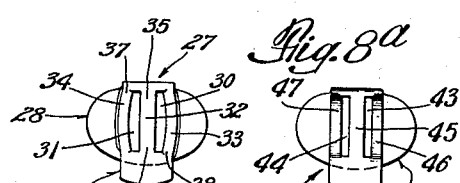
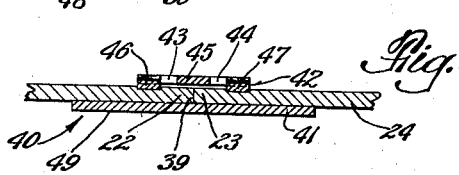
INVENTOR
John Cavanagh
BY William P. Feyrer
ATTORNEY Patented Apr. 11, 1939

2,153,611

UNITED STATES PATENT OFFICE 2,153,611

SWEAT BAND MARKER AND FASTENING CLIP

John Cavanagh, Norwalk, Conn., assignor to Hat Corporation of America, Norwalk, Conn., a corporation of Delaware Application January 6, 1937, Serial No. 119,181

3 Claims. (Cl. 40—9)

My invention relates to a combined sweatband marker and fastening clip.

It is an object of the present invention to provide a clip for a hat sweatband which not only provides a means for carrying indicia of size, store name, and the like, but which also provides a supplemental means for fastening together the abutting ends of a sweatband.

It is a further object of the invention to provide such a clip that may be readily associated with the abutting ends of a sweatband and which will effectively function to fasten the ends together without piercing the sweatband or being secured thereto with an adhesive.

It is another object of the invention to provide a clip particularly adapted for marking and fastening sweatbands, and which may be easily and economically produced.

In obtaining these objects there is provided as a feature of the invention a clip having a tongue with an inwardly projecting gripping section having upper and lower portions integral with the tongue which serve to maintain the inwardly projecting section in firm gripping relation with respect to the sweatband after the clip has been associated therewith.

Another feature of the invention resides in the provision of a clip having a tongue with a pair of inwardly projecting sections spaced transversely thereof, particularly adapted to firmly grip the respective abutting ends of the sweatband and assist in holding them together.

Other objects and features will hereinafter appear.

In the drawing:

Figure 1 is a sectional view of a hat showing the combined sweatband marker and fastening clip in operative association with the sweatband thereof.

Fig. 2 is a side view of the clip prior to the tongue being bent to overlie the body.

Fig. 3 is a sectional view of the clip after the tongue has been bent to overlie the body.

Fig. 4 is a front view of the completely formed clip shown in Fig. 3.

Fig. 5 is a rear view of the completely formed clip shown in operative association with the abutting ends of a sweatband.

Fig. 6 is a sectional view showing the clip in operative association with a sweatband.

Fig. 7 is a sectional view similar to Fig. 6 showing a modified clip in association with the abutting ends of a sweatband.

Fig. 7A is a rear view of the modified clip shown in Fig. 7.

Fig. 8 is a sectional view similar to Fig. 6 but showing another slightly modified clip in association with the abutting ends of a sweatband.

Fig. 8A is a rear view of the modified clip shown in Fig. 8.

Referring more particularly to the drawing and first to Figs. 1 through 6 there is shown a combined sweatband marker and fastening clip 10 having a body 11 with a tongue 12 integral therewith. Formed in the tongue 12 and extending longitudinally thereof are a pair of transversely spaced slots 13 and 14, locating a central section 15 having oppositely disposed portions 16 and 17 respectively, integral with the tongue 12, and two marginal sections 18 and 19 each having upper and lower portions 20 and 21 integral with the tongue.

As shown in Fig. 2, the clip is initially in the form of a unidirectional strip with the tongue 12 extending upwardly from the body 11 and with the central section 15 bowed with respect to the other sections of the tongue. The clip 10 in this form may be easily produced by merely stamping a blank metal sheet with a properly designed die. The central section 15 may be bowed during the stamping operation or this may be accomplished separately in a subsequent operation.

The unidirectional clip 10 as shown in Fig. 2 is then bent in such a way that the tongue 12 overlies the body 11 as shown in Fig. 3. In this now completely formed clip the central bowed section 15 located between the slots 13 and 14 and integrally connected to the tongue 12 through the upper and lower portions 16 and 17, projects inwardly toward the body 11 and constitutes an effective gripping element.

When such a clip 10 is associated with the abutting ends 22 and 23 of a sweatband 24 of a hat 25, such for example as shown in Fig. 1, the central bowed section 15 laps the abutting ends 22 and 23 as seen best in Fig. 6, grips the same and cooperates with the body 11 to fasten and maintain the ends 22 and 23 in proper abutting relation.

Because of the integral connection between the upper and lower portions 16 and 17 of the central bowed section 15 of the tongue 12 an especially firm and positive gripping pressure is maintained. Moreover, because of this integral connection at both the upper and lower portions of the central gripping section no free ends remain to engage the sweatband 24 so as to prevent a ready association and disassociation of the clip 10 therewith.

If desired any suitable indicia, such as the head size shown in Figs. 1 and 4, may be imprinted or otherwise placed on the outer face 26 of the body. Also the outer face of the clip may be provided with indicia 26' to give the hat manufacturer's name or to indicate the name of the store selling the hat. In this way the clip not only serves to aid in maintaining the abutting ends 22 and 23 of a sweatband 24 in proper abutting relation but also serves to mark the sweatband 24, provide some advertising and give it a finished appearance.

In Figs. 7 and 7A a slightly modified clip 27 is shown which may be formed, as the one first described, by merely stamping from a blank metal sheet and then bending to assume an operative configuration. This modified clip 27 has a body 28 with a tongue 29 overlying the latter, the tongue being provided with a pair of transversely spaced slots 30 and 31 extending longitudinally thereof which divide the tongue into a central section 32 and marginal sections 33 and 34 at either side thereof. In this respect the modified clip 27 is the same as the clip 10 disclosed in Figs. 1 to 6, the central section 32 having upper and lower portions 35 and 36 integral with the tongue and the marginal sections 33 and 34 each having upper and lower portions 37 and 38 integral with the tongue.

It differs from the clip 10 in that the central section 32 is not bowed. Instead the two marginal sections 33 and 34 are bent on a line extending longitudinally thereof to extend inwardly toward the body 28 adjacent the slots 30 and 31. With this construction two separate gripping elements are provided by the marginal sections 33 and 34 to respectively engage the abutting ends 22 and 23 of a sweatband 24 at either side of the joining line 39 and cooperate with the body 28 to assist in maintaining and fastening the ends 22 and 23 in proper abutting relation.

The modified clip 40 shown in Figs. 8 and 8A, like the clips 10 and 27 heretofore described, has a body 41 with an integral tongue 42 overlying the same and provided with transversely spaced longitudinally extending internal slots 43 and 44 dividing the tongue into a central section 45 and two marginal sections 46 and 47, all integrally connected to the tongue 42 at both their upper and lower portions. In this modified clip 40, however, the two marginal sections 46 and 47 are bowed to provide gripping elements extending inwardly toward the body. The bowed marginal sections 46 and 47 in this form, therefore, are adapted to respectively engage the abutting ends 22 and 23 of the sweatband 24 at either side of the joining line 39 in much the same manner as the longitudinally bent marginal sections in the modified clip 27 illustrated in Figs. 7 and 7A to cooperate with the body 28 and maintain and fasten the ends 22 and 23 in proper abutting relation.

It is to be understood that suitable indicia may be placed on the outer faces 48 and 49 of the bodies 28 and 41 of the modified clips 27 and 40 respectively, in the same manner as with the clip 10 shown in Figs. 1 to 6 and that all of the clips therefore are adapted to serve not only to fasten the abutting ends of a sweatband but also to mark and finish a sweatband, the modified clips 27 and 40 being especially efficient to maintain the abutting ends of a sweatband in proper relation because of the two separate gripping elements provided at either side of the joining line.

Having thus described the invention what is claimed as new is:

1. A combined sweatband marker and fastening clip, comprising a body; a tongue having an upper end integral with said body and overlying the same, having a pair of transversely spaced slots of substantial length relative to the length of said tongue, extending longitudinally thereof and terminating short of the lower end of the tongue, dividing said tongue into a central section and two marginal sections spaced laterally from said central section, each of said sections having upper and lower portions integral with said tongue, and said marginal sections being bowed inwardly toward said body.

2. A combined sweatband marker and fastening clip, comprising a body; a tongue integral with said body and overlying the same, having a pair of transversely spaced slots extending longitudinally thereof dividing said tongue into a central section and two marginal sections, each of said sections having upper and lower portions integral with said tongue, and said marginal sections being bent on a line extending longitudinally thereof to extend inwardly adjacent said slots.

3. A combined sweatband marker and fastening clip, comprising a body; a tongue integral with said body and overlying the same, having a pair of transversely spaced slots extending longitudinally thereof dividing said tongue into a central section and two marginal sections, each of said sections having upper and lower portions integral with said tongue, and at least one of said marginal sections being bent on a line extending longitudinally thereof to extend inwardly toward said body.

JOHN CAVANAGH.